United States Patent
Lu et al.

(10) Patent No.: US 9,680,152 B2
(45) Date of Patent: Jun. 13, 2017

(54) TRANSITION METAL HEXACYANOFERRATE BATTERY WITH CARBONACEOUS ANODE

(71) Applicant: Sharp Laboratories of America, Inc., Camas, WA (US)

(72) Inventors: Yuhao Lu, Vancouver, WA (US); Hidayat Kisdarjono, Vancouver, WA (US); Jong-Jan Lee, Camas, WA (US); David Evans, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 15/173,866

(22) Filed: Jun. 6, 2016

(65) Prior Publication Data

US 2016/0285098 A1 Sep. 29, 2016

Related U.S. Application Data

(60) Continuation of application No. 14/744,476, filed on Jun. 19, 2015, now Pat. No. 9,385,370, which is a
(Continued)

(51) Int. Cl.
*H01M 4/58* (2010.01)
*H01M 4/136* (2010.01)
(Continued)

(52) U.S. Cl.
CPC ......... *H01M 4/5825* (2013.01); *H01M 4/136* (2013.01); *H01M 4/58* (2013.01);
(Continued)

(58) Field of Classification Search
CPC .... H01M 4/136; H01M 10/054; H01M 4/133; H01M 4/381; H01M 4/58; H02J 7/0063;
(Continued)

(56) References Cited

U.S. PATENT DOCUMENTS

| | | | | |
|---|---|---|---|---|
| 2012/0328936 A1* | 12/2012 | Wessells | ............. | H01M 10/054 429/188 |
| 2014/0295311 A1* | 10/2014 | Lipka | .................... | H01M 8/188 429/452 |
| 2016/0020490 A1* | 1/2016 | Yamaguchi | ......... | H01M 2/1673 429/126 |

* cited by examiner

*Primary Examiner* — Mark F Huff
*Assistant Examiner* — Monique Wills
(74) *Attorney, Agent, or Firm* — Law Office of Gerald Maliszewski; Gerald Maliszewski

(57) ABSTRACT

A transition metal hexacyanoferrate (TMH) cathode battery is provided. The battery has a $A_xMn[Fe(CN)_6]_y \cdot zH_2O$ cathode, where the A cations are either alkali or alkaline-earth cations, such as sodium or potassium, where x is in the range of 1 to 2, where y is in the range of 0.5 to 1, and where z is in the range of 0 to 3.5. The $A_xMn[Fe(CN)_6]_y \cdot zH_2O$ has a rhombohedral crystal structure with $Mn^{2+/3+}$ and $Fe^{2+/3+}$ having the same reduction/oxidation potential. The battery also has an electrolyte, and anode made of an A metal, an A composite, or a material that can host A atoms. The battery has a single plateau charging curve, where a single plateau charging curve is defined as a constant charging voltage slope between 15% and 85% battery charge capacity. Fabrication methods are also provided.

10 Claims, 9 Drawing Sheets

Related U.S. Application Data division of application No. 13/752,930, filed on Jan. 29, 2013, now Pat. No. 9,099,718, which is a continuation-in-part of application No. 13/603,322, filed on Sep. 4, 2012, now Pat. No. 9,159,502, and a continuation-in-part of application No. 13/523,694, filed on Jun. 14, 2012, now Pat. No. 8,956,760, which is a continuation-in-part of application No. 13/449,195, filed on Apr. 17, 2012, now Pat. No. 9,559,358, which is a continuation-in-part of application No. 13/432,993, filed on Mar. 28, 2012, now Pat. No. 9,269,953.

(51) Int. Cl.
*H02J 7/00* (2006.01)
*H01M 10/054* (2010.01)
*H01M 10/0568* (2010.01)
*H01M 10/44* (2006.01)
*H01M 4/62* (2006.01)
*H01M 4/02* (2006.01)

(52) U.S. Cl.
CPC ......... *H01M 4/625* (2013.01); *H01M 10/054* (2013.01); *H01M 10/0568* (2013.01); *H01M 10/446* (2013.01); *H02J 7/0063* (2013.01); *H02J 7/0068* (2013.01); *H01M 2004/028* (2013.01); *Y02E 60/122* (2013.01)

(58) Field of Classification Search
CPC ...... H02J 7/0068; Y02E 60/122; Y02E 60/50; C01B 31/00; C01B 31/30
See application file for complete search history.

TRANSITION METAL HEXACYANOFERRATE BATTERY WITH CARBONACEOUS ANODE

RELATED APPLICATIONS

This application is a Continuation of an application entitled, TRANSITION METAL HEXACYANOFERRATE BATTERY CATHODE WITH SINGLE PLATEAU CHARGE/DISCHARGE CURVE, invented by Yuhao Lu et al., Ser. No. 14/744,476, filed Jun. 19, 2015;

which is a Divisional of an application entitled, TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013;

which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012;

Ser. No. 13/752,930 is a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012, now U.S. Pat. No. 8,957,796, with an issue date of Feb. 17, 2015;

which is a Continuation-in-Part of a pending application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012;

which is a Continuation-in-Part of a pending application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012. All these applications are incorporated herein by reference.

BACKGROUND OF THE INVENTION

1. Field of the Invention

This invention generally relates to electrochemical cells and, more particularly, to a transition-metal hexacyanoferrate (TMH) cathode battery and associated fabrication processes.

2. Description of the Related Art

A battery is an electrochemical cell through which chemical energy and electric energy can be converted back and forth. The energy density of a battery is determined by its voltage and charge capacity. Lithium has the most negative potential of −3.04 V vs. $H_2/H^+$, and has the highest gravimetric capacity of 3860 milliamp-hours per gram (mAh/g). Due to their high energy densities, lithium-ion batteries have led the portable electronics revolution. However, the high cost of lithium metal renders doubtful the commercialization of lithium batteries as large scale energy storage devices. Further, the demand for lithium and its reserve as a mineral have raised the need to build other types metal-ion batteries as an alternative.

Lithium-ion (Li-ion) batteries employ lithium storage compounds as the positive (cathode) and negative (anode) electrode materials. As a battery is cycled, lithium ions ($Li^+$) are exchanged between the positive and negative electrodes. Li-ion batteries have been referred to as rocking chair batteries because the lithium ions "rock" back and forth between the positive and negative electrodes as the cells are charged and discharged. The positive electrode (cathode) material is typically a metal oxide with a layered structure, such as lithium cobalt oxide ($LiCoO_2$), or a material having a tunneled structure, such as lithium manganese oxide ($LiMn_2O_4$), on an aluminum current collector. The negative electrode (anode) material is typically a graphitic carbon, also a layered material, on a copper current collector, in the charge-discharge process, lithium ions are inserted into, or extracted from interstitial spaces of the active materials.

Similar to the lithium-ion batteries, metal-ion batteries use the metal-ion host compounds as their electrode materials in which metal-ions can move easily and reversibly. As for a $Li^+$-ion, it has one of the smallest radii of all metal ions and is compatible with the interstitial spaces of many materials, such as the layered $LiCoO_2$, olivine-structured $LiFePO_4$, spinel-structured $LiMn_2O_4$, and so on. Other metal ions, such as $Na^+$, $K^+$, $Mg^{2+}$, $Al^{3+}$, $Zn^{2+}$, etc., with large sizes, severely distort Li-based intercalation compounds and ruin their structures in several charge/discharge cycles. Therefore, new materials with large interstitial spaces would have to be used to host such metal-ions in a metal-ion battery.

Transition-metal hexacyanoferrates (TMHs) have been investigated as the cathode materials in lithium-ion batteries (LIBs) [1, 2] because they accommodate lithium-ion intercalation in their interstitial spaces. However, the lithium-ion size is too small to match the spaces, which degrades the TMH capacities rapidly during lithium-ion intercalation. In 2004, Eftekhari [3] used iron hexacyanoferrate (Prussian blue) as the cathode material in potassium-ion batteries (KIBs) with a counter electrode of potassium metal. The organic electrolyte was 1M $KBF_4$ in 3:7 ethylene carbonate/ethylmethyl carbonate (wt.). The size of potassium-ion is almost two times that of the lithium-ions, and matches the interstitial spaces of Prussian blue very well. The results showed that Prussian blue was a good electrode material for KIBs, demonstrating a reversible capacity of ca. 75 mAh/g and a good capacity retention.

Similarly, Cui's group studied the intercalation behavior of large ions, for example, sodium, potassium and ammonium ions, in copper (CuHCF) and nickel hexacyanoferrates (NiHCF) with an aqueous electrolyte [4-6]. These large size ions were compatible with the interstitial spaces of the hexacyanoferrates, so that CuHCF and NiHCF demonstrated good capacity retention. Due to the narrow electrochemical window of water, these materials were evaluated under low voltages and demonstrated low energy density. In order to improve the performance, organic electrolytes with a wide electrochemical window would have to be used to increase the operation voltages of the TMH electrodes.

Goodenough's group [7] investigated a series of Prussian blue analogues in sodium-ion batteries (SIBs) with organic electrolytes. They found that $KFe(II)Fe(III)(CN)_6$ demonstrated the highest capacity of 95 mAh/g, and $KMnFe(CN)_6$, $KNiFe(CN)_6$, $KCuFe(CN)_6$, and $KCoFe(CN)_6$ had a capacity of 50~70 mAh/g. In the first 20 cycles, the capacity retention of $KFeFe(CN)_6$ was higher than 97%.

FIG. 1 is a diagram depicting the crystal structure of a transition-metal hexacyanoferrate (TMH) in the form of $A_xM1M2(CN)_6$ (prior art). TMHs have an open framework. The large tetrahedrally coordinated A sites can host alkali, alkaline ions ($A_x$), and $H_2O$ molecules. The number of alkali or alkaline ions in the large cages of this crystallographically porous framework may vary from x=0 to x=2, depending on the valence of M1 and M2 that are metal ions. Of course, as the electrode materials in SIBs or KIBs, TMHs are expected to have two of $Na^+$- or $K^+$-ions in their interstitial spaces. Therefore, M1 and M2 with valences of +2 are selected in the synthesis process to produce $(Na,K)_2M1M2(CN)_6$. Moreover, M1 and M2 can be reversibly oxidized and reduced between the valences of +2 and +3 when $Na^+$- or $K^+$-ions are extracted/inserted from/into TMHs. When these TMHs are used as the electrode materials in SIBs or KIBs, it is hard to obtain very smooth and flat charge/discharge curves due to the fact that M1 and M2 have different chemical potentials, or occupy different spin states. For example, $Na_2CoFe(CN)_6$ exhibited two plateaus in its discharge curves at 3.78 V and 3.28 V vs. $Na/Na^+$, that correspond to the reduction of $Co^{3+}$ and $Fe^{3+}$, respectively [8].

In order to obtain cheap electrode materials for batteries, manganese is a good choice for TMHs, e.g., $(Na,K)_x Mn[Fe(CN)_6]_y \cdot zH_2O$. Matsuda and Moritomo [9] synthesized a $Na_{1.32}Mn[Fe(CN)_6] \cdot 3.5H_2O$ film for a lithium-ion battery that showed three plateaus in its discharge curve, and two plateaus in its charge curve that could be explained by the reduction and oxidation of Mn and Fe in the material. In the battery, the materials showed a capacity of 128 mAh/g. In a sodium-ion battery, Goodenough's group [7] also reported multiple plateaus in its charge/discharge curves. The Mn-based TMHs demonstrated a capacity of 70 mAh/g. However, it would be better to have a single, rather than two voltage plateaus in the charge/discharge curves. A battery with a single plateau charge/discharge curve has a tighter (more uniform) charge/discharge voltage than a battery with multiple plateaus. A tighter charge/discharge voltage renders a simpler battery control.

FIGS. 11A and 11B are graphs depicting the electrochemical behavior of a synthesized $Na_xMn[Fe(CN)_6]_y \cdot zH_2O$ cathode in sodium-ion batteries (prior art). When sodium ions electrochemically move in and out of the interstitial space of magnesium hexacyanoferrate (MnHCF), two main potentials appear in the charge or discharge process, due to the redox reaction of Mn and Fe [7, 9] in MnHCF. In battery applications, the redox reaction of MnHCF causes two plateaus during charge/discharge. Two plateaus are observed during charge/discharge that correspond to the redox reaction of Mn at higher voltages and the redox reaction of Fe at low voltages.

[1] V. D. Neff, Some performance characteristics of a Prussian Blue battery, Journal of Electrochemical Society, 132 (1985) 1382-1384.

[2] N. Imanishi, T. Morikawa, J. Kondo, Y. Takeda, O. Yamamoto, N. Kinugasa, T. Yamagishi, Lithium intercalation behavior into iron cyanide complex as positive electrode of lithium secondary battery, Journal of Power Sources, 79 (1999) 215-219.

[3] Ali Eftekhari., Potassium secondary cell based on Prussian blue cathode, Journal of Power Sources, 126 (2004) 221-228.

[4] Colin D. Wessells, Rober A. Huggins, Yi Cui, Copper hexacyanoferrate battery electrodes with long cycle life and high power, Nature Communication, 2(2011) 550.

[5] Colin D. Wessells, Sandeep V. Peddada, Robert A. Huggins, Yi Cui, Nickel hexacyanoferrate nanoparticie electrodes for aqueous sodium and potassium ion batteries. Nano Letters, 11(2011) 5421-5425.

[6] Colin D. Wessells, Sandeep V. Peddada, M. T. McDowell, Robert A. Huggins, Yi Cui, The effect of insertion species on nanostructured open framework hexacyanoferrate battery electrodes, Journal of Electrochemical Society, 159 (2012) A98-A103.

[7] Yuhao Lu, Long Wang, John B. Goodenough, Prussian blue: a new framework for sodium batteries, Chemistry Communication, 48(2012)6544-6546.

[8] J. F. Qian, M. Zou, Y. L. Cao, H. X. Yang, $Na_xM_yFe(CN)_6$ (M=Fe, Co, Ni): A New class of cathode Materials for sodium Ion batteries, Journal of Electrochemistry (Chinese), 18(2012)108-112.

[9] T. Matsuda, Y. Moritomo, Thin film electrode of Prussian blue analogue for Li-ion battery, Applied Physics Express, 4(2011)047101.

It would be advantageous if a TMH cathode battery could be made to operate with a single plateau charge and discharge curve.

SUMMARY OF THE INVENTION

Disclosed herein are processes to prepare transition-metal hexacyanoferrate (TMH), such as $(Na,K)_xMn[Fe(CN)_6]_y \cdot zH_2O$ for sodium-ion batteries (SIBs) or potassium-ion batteries (KIBs). Three factors are associated with the improved processes. Firstly, reductive agents may be added into the synthesis solution to protect $Mn^{2+}$ and $Fe^{2+}$ from oxidation, so that more $Na^+$- or $K^+$-ions can be kept in the interstitial spaces of $(Na,K)_xMn[Fe(CN)_6]_y \cdot zH_2O$. Secondly, the product may be vacuum-dried at a temperature range from 200° C. to 200° C., regardless of whether it has been previously dried in air. Lastly, electronic conductors, for example, carbonaceous materials, can be dispersed into the reaction solution to improve performance of $(Na,K)_xMn[Fe(CN)_6]_y \cdot zH_2O$ as electrode materials in SIBS or KIBs. The process can obtain $(Na,K)_xMn[Fe(CN)_6]_y \cdot zH_2O$ with the following performance:

(1) Just single plateau appears the charge/discharge curves.

(2) The charge/discharge curves are smooth and flat.

(3) The material exhibits a high capacity, energy efficiency, and coulombic efficiency.

Accordingly, a TMH cathode battery is provided. The battery has a $A_xMn[Fe(CN)_6]_y \cdot zH_2O$ cathode, where the A cations are either alkali or alkaline-earth cations, where x is in the range of 1 to 2, where y is in the range of 0.5 to 1, and where z is in the range of 0 to 3.5. The $A_xMn[Fe(CN)_6] \cdot zH_2O$ has a rhombohedral crystal structure with $Mn^{2+/3+}$ and $Fe^{2+/3+}$ having the same reduction/oxidation potential. The battery also has an electrolyte, and an anode made of an A metal, an A composite, or a material that can host A atoms. The electrolyte may be an organic solvent containing an A-atom salt. In one aspect, A is either sodium (Na) or potassium (K).

The battery has a single plateau charging curve, where a single plateau charging curve is defined as a constant charging voltage slope between 15% and 85% battery charge capacity. Likewise, the battery has a single plateau discharge curve, where a single plateau discharge curve is defined as a constant discharge voltage slope between 85% and 15% battery charge capacity.

Additional details of the above-described battery, battery cathode, battery fabrication, and battery usage are described below.

DETAILED DESCRIPTION

Figure 1:
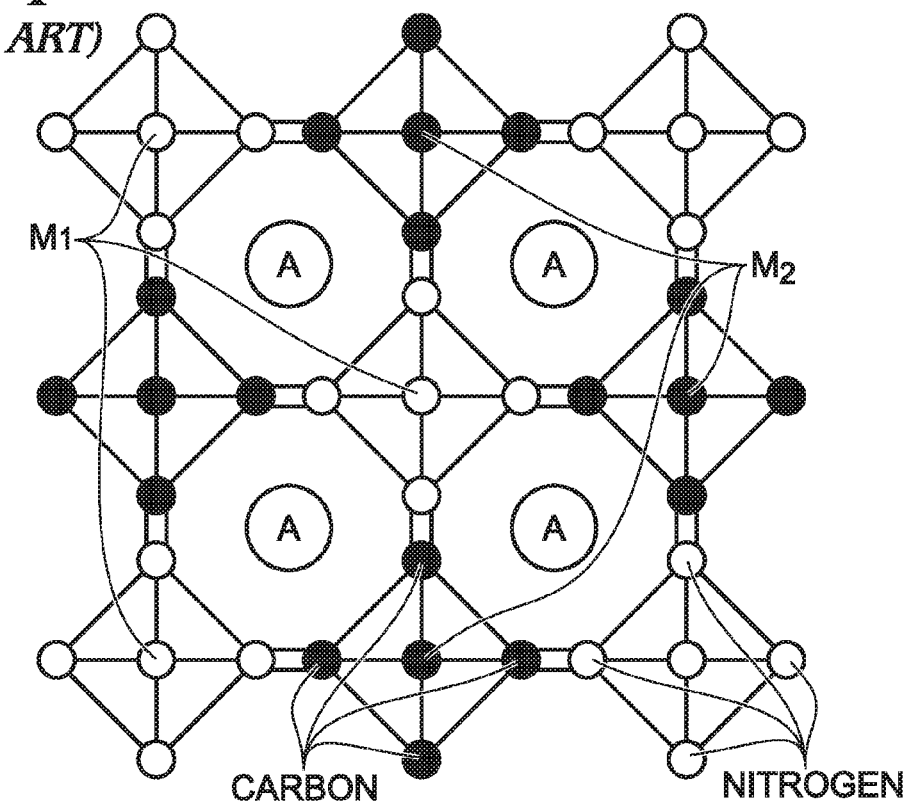
FIG. 1 is a diagram depicting the crystal structure of a transition-metal hexacyanoferrate (TMH) in the form of $A_xM1M2(CN)_6$ (prior art).
Figure 2A:
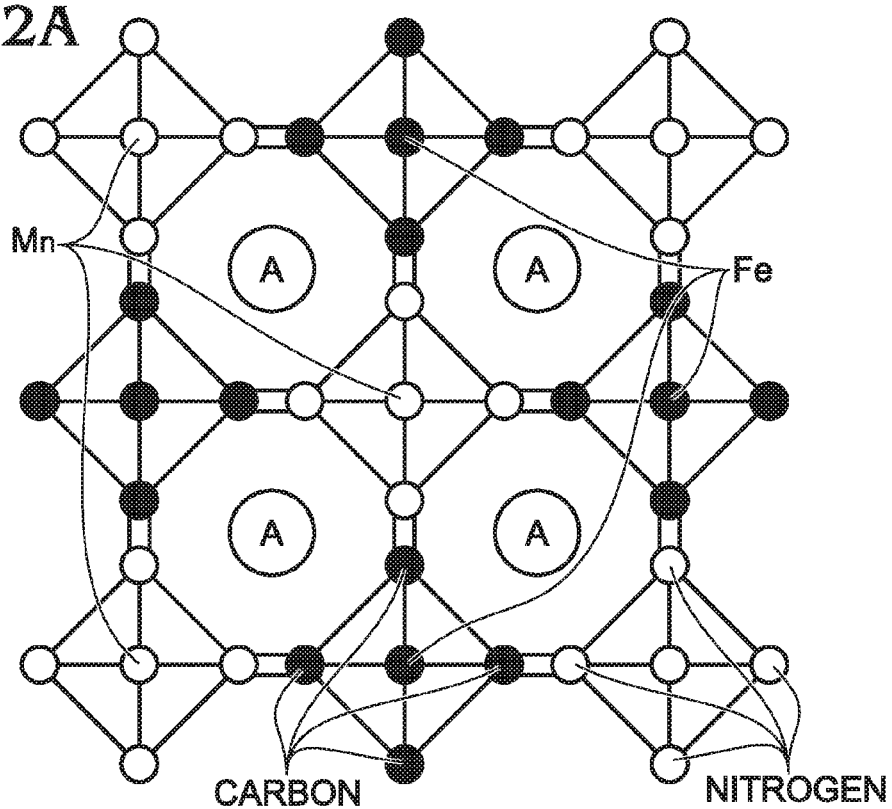
FIG. 2A is a diagram depicting an $A_xMnFe(CN)_6$ crystal structure, as an example of a TMH battery cathode material.

FIG. 2A is a diagram depicting an $A_xMnFe(CN)_6$ crystal structure, as an example of a TMH battery cathode material. The cathode comprises $A_xMn[Fe(CN)_6]_y \cdot zH_2O$;

where A cations are alkali or alkaline-earth cations;

where x is in the range of 1 to 2;

where y is in the range of 0.5 to 1; and, where z is in the range of 0 to 3.5.

The $A_xMnFe[(CN)_6]_y \cdot zH_2O$ has a rhombohedral crystal structure with $Mn^{2+/3+}$ and $Fe^{2+/3+}$ having the same reduction/oxidation potential. In one aspect, the A cations may be either sodium (Na) or potassium (K).

Figure 2B:
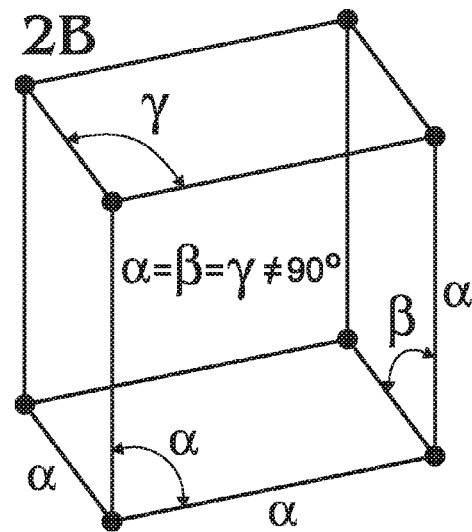
FIG. 2B is a diagram depicting a rhombohedral crystal structure.

FIG. 2B is a diagram depicting a rhombohedral crystal structure. This structure is just a little bit "twisted" from a cubic crystal structure ($\alpha=\beta=\gamma=90°$). Although the rhombohedral crystal structure cannot physically be seen under a microscope, it can be detected using X-ray diffraction, see FIGS. 5A and 5B.

Figure 3:
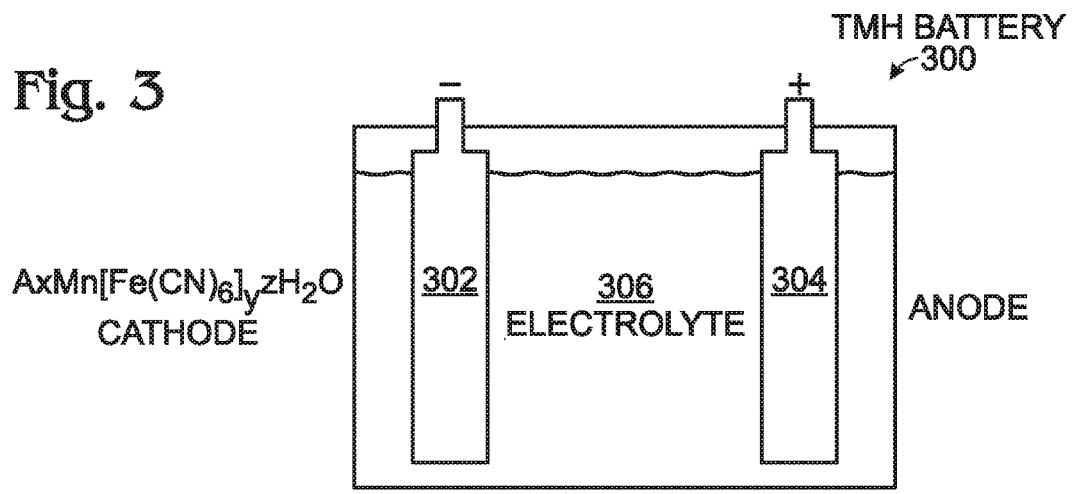
FIG. 3 is a partial cross-sectional view of a TMH cathode battery.

FIG. 3 is a partial cross-sectional view of a TMH cathode battery. The battery 300 comprises a $A_xMn[Fe(CN)_6]_y \cdot zH_2O$ cathode 302, where A cations are either alkali or alkaline-earth cations, where x is in the range of 1 to 2, where y is in the range of 0.5 to 1 and where z is the range of 0 to 3.5, see FIG. 2A. The $A_xMn[Fe(CN)_6]_y \cdot zH_2O$ has a rhombohedral crystal structure, with $Mn^{2+/3+}$ and $Fe^{2+/3+}$ having the same reduction/oxidation potential. The battery 300 has an anode 304 made from an A metal, an A composite, or a material that can host A atoms. The battery 300 further comprises an electrolyte 306. The electrolyte may, for example, be an organic solvent containing A-atom salts. In one aspect, A is either Na or K.

Figure 4:
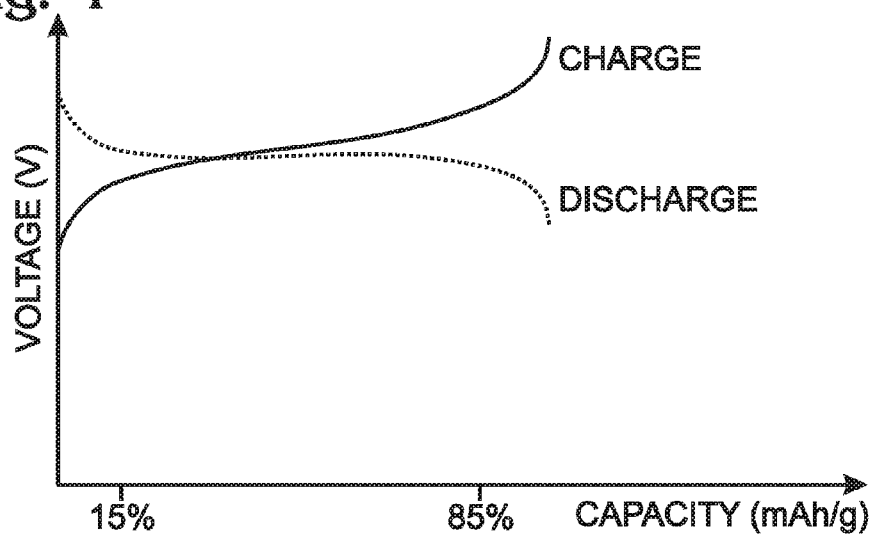
FIG. 4 is a diagram depicting charging and discharging curves associated with the battery of FIG. 3.

FIG. 4 is a diagram depicting charging and discharging curves associated with the battery of FIG. 3. As shown, the battery has a single plateau charging curve, where a single plateau charging curve is defined as a constant charging voltage slope between 15% and 85% battery charge capacity. Likewise, the battery has a single plateau discharge curve, where a single plateau discharge curve is defined as a constant discharge voltage slope between 85% and 15% battery charge capacity. It should be understood that the 15% and 85% battery charge capacity values may vary depending upon a particular design, and that in some instances, the range may extend to less than 15% battery charge capacity, and/or greater than 85%. Alternatively stated, the battery has a single plateau charging/discharging curve, where a single plateau charging/discharging curve is defined by the derivative of charge capacity to voltage (dQ/dV) of a completed charging/discharging curve having only one peak. In one aspect, the above-mentioned single plateau curves are associated with a battery having a discharge capacity of greater than 90 milliamp hours per gram (mAh/g). Alternatively stated, when there are two A atoms in a lattice (x=2), and all TMH materials are active (meaning they can charge and discharge), the discharge capacity associated with the first A atom is 90 mAh/g capacity. The discharge of the second A atom in the lattice increases the capacity to a value greater than 90 mAh/g.

As explained above, sodium or potassium $(Na,K)_xMn[Fe(CN)_6]_y \cdot zH_2O$ can be fabricated for sodium-ion batteries (SIBs) or potassium-ion batteries (KIBs) that demonstrate a single plateau during charge/discharge. In addition, these batteries have a high capacity. The preparation described herein (1) increases the value of x in $(Na,K)_xMn[Fe(CN)_6]_y \cdot zH_2O$ to obtain high capacity; (2) reduces the value of z in $(Na,K)_xMn[Fe(CN)_6]_y \cdot zH_2O$; and, (3) enhances the electronic conductivity of $(Na,K)_xMn[Fe(CN)_6]_y \cdot zH_2O$.

Precipitation is a simple method to synthesize $(Na,K)_xMn[Fe(CN)_6]_y \cdot zH_2O$. A $Mn^{2+}$ solution and a $Fe(CN)_6^{4-}$ solution are mixed, and $(Na,K)1_xMn[Fe(CN)_6]_y \cdot zH_2O$ precipitates immediately. When the process is exposed to air, it is inevitable that $Mn^{2+}$- or $Fe^{2+}$-ions are oxidized to $Mn^{3+}$ or $Fe^{3+}$. The oxidation reduces the content of $Na^+$ or $K^+$ in the final product of $(Na,K)_xMn[Fe(CN)_6]_y \cdot zH_2O$ because all charges should be neutralized in the material. As electrode materials, the small content of $Na^+$ or $K^+$ means a small capacity of $(Na,K)_xMn[Fe(CN)_6]_y \cdot zH_2O$ for SIBs or KIBs. In order to prevent the oxidation in the synthesis, reductive agents can be added into both the $Mn^{2+}$ solution, the $Fe(CN)_6^{4-}$ solution, or both, at the beginning of the process. The reductive agents may, for example, be sodium borohydride ($NaBH_4$) and hydrazine ($N_{24}$), but other agents would be apparent to those with skill in the art. In the solution of $Mn^{2+}$, the concentration of reductive agents is from 0 to 100 moles/liter. In the solution of $Fe(CN)_6^{4-}$, the concentration of reductive agents is from 0 to 100 moles/liter. After the reaction finishes, the precipitate is collected and washed to obtain $(Na,K)_xMn[Fe(CN)_6]_y \cdot zH_2O$.

Figure 5A:
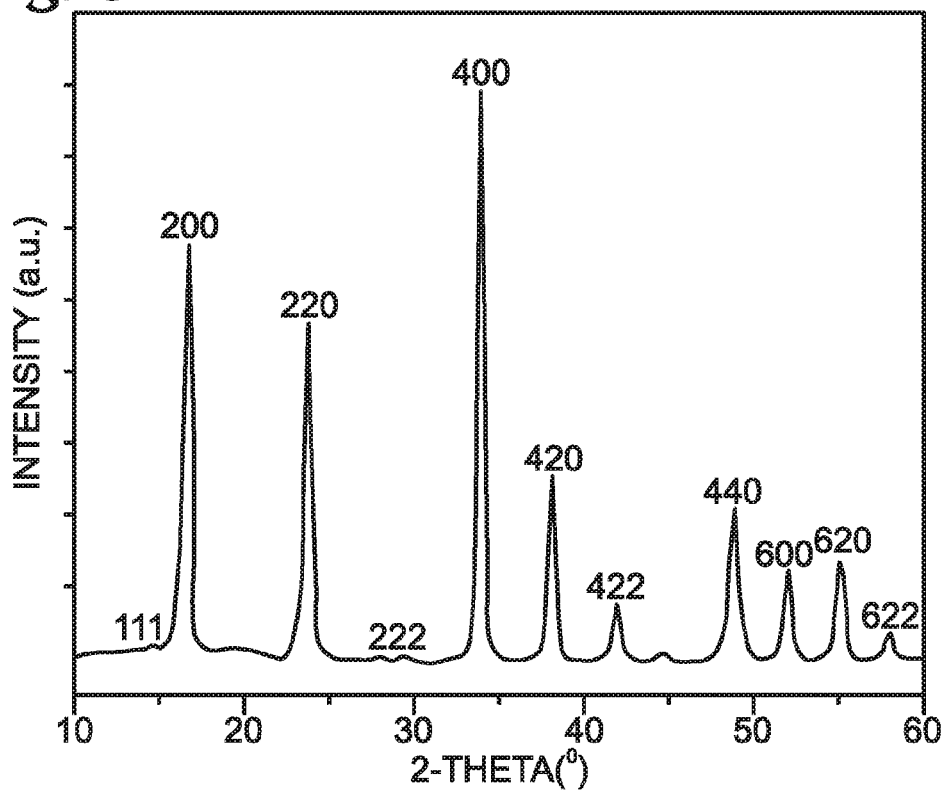
FIGS. 5A and 5B are X-ray diffraction (XRD) patterns contrasting, respectively, $(Na,K)_xMn[Fe(CN)_6]_y \cdot zH_2O$ dried in air, with vacuum drying.
Figure 5B:
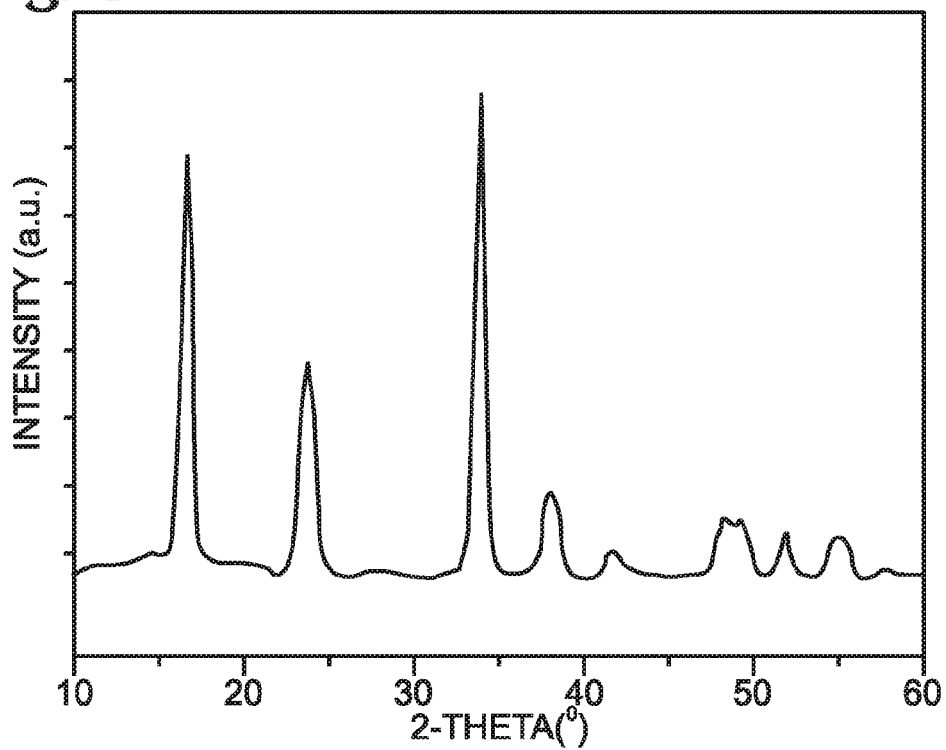

FIGS. 5A and 5B are X-ray diffraction (XRD) patterns contrasting, respectively, $(Na,K)_xMn[Fe(CN)_6]_y \cdot zH_2O$ dried in air, with vacuum drying. The XRD pattern of FIG. 5A is associated with a cubic crystal structure and the XRD pattern of FIG. 5B is associated with a rhombohedral crystal pattern. $(Na,K)_xMn[Fe(CN)_6]_y \cdot zH_2O$ can be dried in either air or in a vacuum. The crystal structure and performance of the $(Na,K)_xMn[Fe(CN)_6]_y \cdot zH_2O$ is highly dependent upon drying condition. $Na_xMn[Fe(CN)_6]_y \cdot zH_2O$ dried in air (FIG. 5A) has a cubic structure, but it shows a structure change to a rhombohedral phase after being dried in a vacuum with a pressure of less than 0.1 torr (FIG. 5B).

Figure 6A:
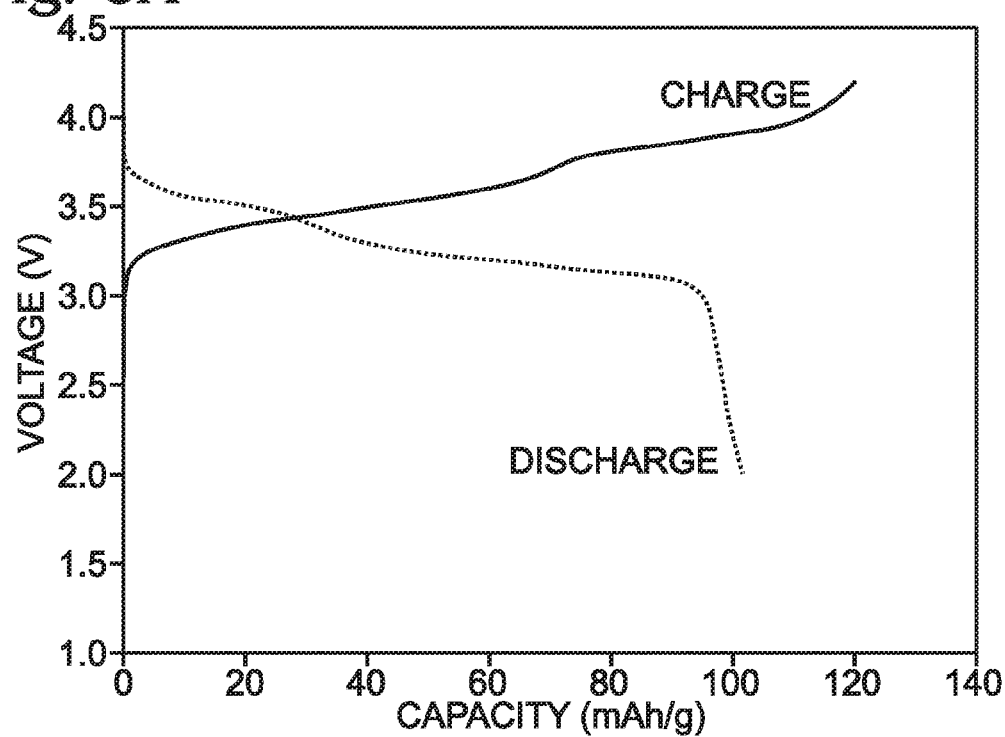
FIGS. 6A and 6B are graphs contrasting the electrochemical behavior of $Na_xMn[Fe(CN)_6]_y \cdot zH_2O$ dried in different conditions.
Figure 6B:
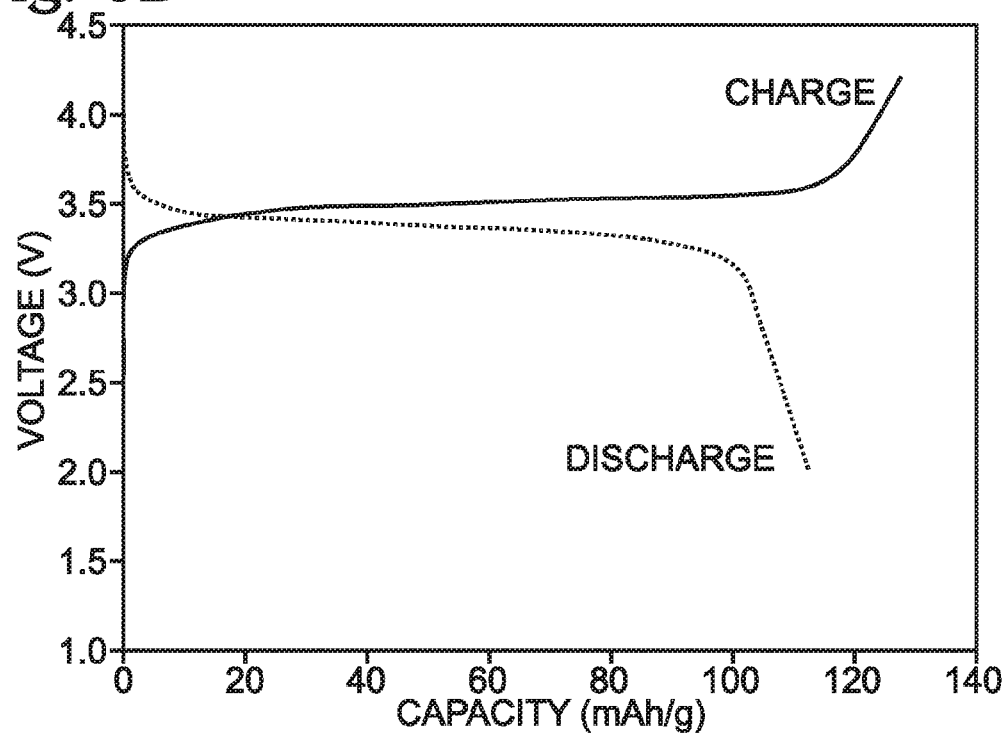

FIGS. 6A and 6B are graphs contrasting the electrochemical behavior of $Na_xMn[Fe(CN)_6]_y \cdot zH_2O$ dried in different conditions. A $Na_xMn[Fe(CN)_6]_y \cdot zH_2O$ cathode was evaluated in standard CR2032 coin cells that consisted of a sodium anode or hard carbon anode, separated by a Celgard polypropylene separator. The $Na_xMn[Fe(CN)_6]_y \cdot zH_2O$ electrode was made of $Na_xMn[Fe(CN)_6]_y \cdot zH_2O$, carbon black (Super P), and polytetrafluoroethylene (PTFE) binder. The electrolyte was saturated $NaClO_4$ in 1:1 ethylene carbonate/diethyl carbonate (EC/DEC) (vol.:vol.). The charge/discharge currents were 0.1 C @170 milliamp-hours per gram (mAh/g). All cells were cycled between 2 V and 4.2 V.

After being dried in air, the $Na_xMn[Fe(CN)_6]_y \cdot zH_2O$ shows two plateaus during charge and discharge (FIG. 6A). However, only one plateau is observed in the charge/discharge curves after vacuum drying with a pressure of less than 0.1 torr (FIG. 6B). Moreover, the vacuum drying process increases the energy density and efficiency of $Na_xMn[Fe(CN)_6]_y \cdot zH_2O$. The fact that a material with the same chemical formula of $Na_xMn[Fe(CN)_6]_y \cdot zH_2O$ may demonstrate different crystal structures and different charge/discharge profiles is a result of different drying conditions.

In order to improve the performance of $(Na,K)_xMn[Fe(CN)_6]_y \cdot zH_2O$ in SIBs or KIBs further, manganese TMHs can be composited with electronic conductors. In the composite structure, small sized $(Na,K)_xMn[Fe(CN)_6]_y \cdot zH_2O$ particles can be uniformly coated on the large surface area of the conductors, so that the electronic conductivity of the $(Na,K)_xMn[Fe(CN)_6]_y \cdot zH_2O$ electrode is improved, and the utilization rate of the active $(Na,K)_xMn[Fe(CN)_6]_y \cdot zH_2O$ material is improved. The high conductivity, uniform distribution of $(Na,K)_xMn[Fe(CN)_6]_y \cdot zH_2O$, and high utilization rate improves battery performance in terms of capacity and power. The electronic conductor may be metal powders, carbonaceous materials, and polymers, but is not limited to just these examples. With the vacuum drying process, a $(Na,K)_xMn[Fe(CN)_6]_y \cdot zH_2O$ conductor composite structured electrode shows a single plateau during charge and discharge. Moreover, its capacity is improved significantly due to the higher utilization rate.

A composite of graphene and $Na_xMn[Fe(CN)_6]_y \cdot zH_2O$, as an example, is also useful in processing. Graphene oxide is ultrasonically dispersed into distilled water. The graphene oxide solution can be put into the $Mn^{2+}$ solution, the $Fe(CN)_6^{4-}$ solution, or both. Using the precipitation method with reductive agent, the graphene oxide is graphene and a composite of graphene and $Na_xMn[Fe(CN)_6]_y \cdot zH_2O$ forms. After separation and washing, the composite is dried in an oven at a temperature between 20° C. and 200° C. The final product is a composite $Na_xMn[Fe(CN)_6]_y \cdot zH_2O$/graphene powder. If the drying is in an vacuum oven with pressure less than 0.1 torr, the $Na_xMn[Fe(CN)_6]_y \cdot zH_2O$ has a rhombohedral crystal structure.

Figure 7A:
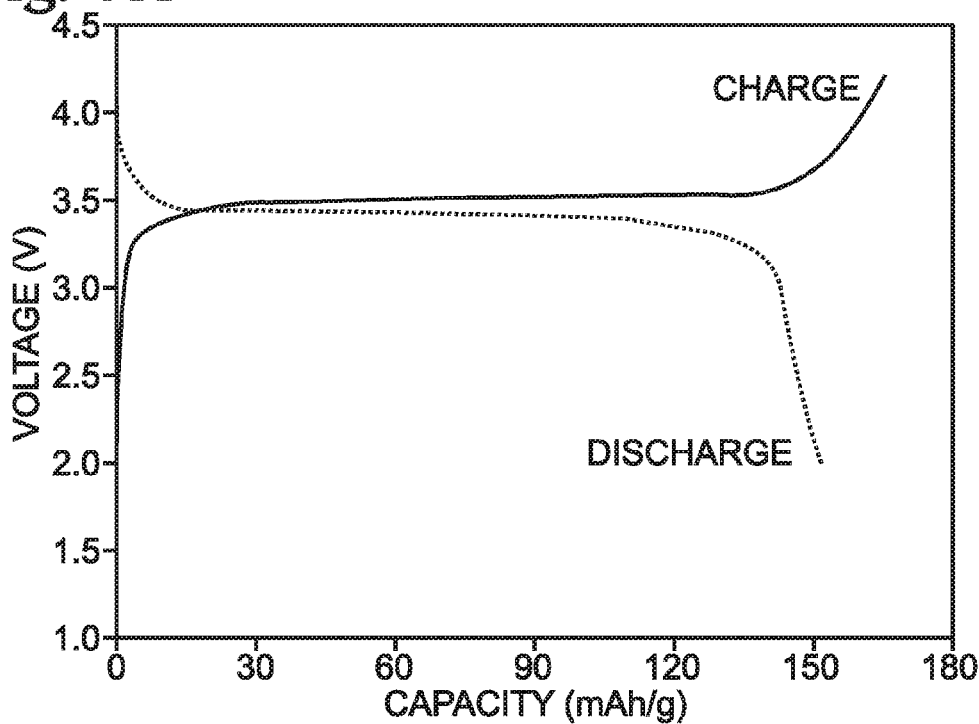
FIGS. 7A and 7B respectively depict the charge/discharge profile of the composite of graphene oxide graphene) and $Na_xMn[Fe(CN)_6]_y \cdot zH_2O$, and a chronoamperogram of the composite of graphene oxide (or graphene) and $Na_xMn[Fe(CN)_6]_y \cdot zH_2O$ at the second cycle.
Figure 7B:
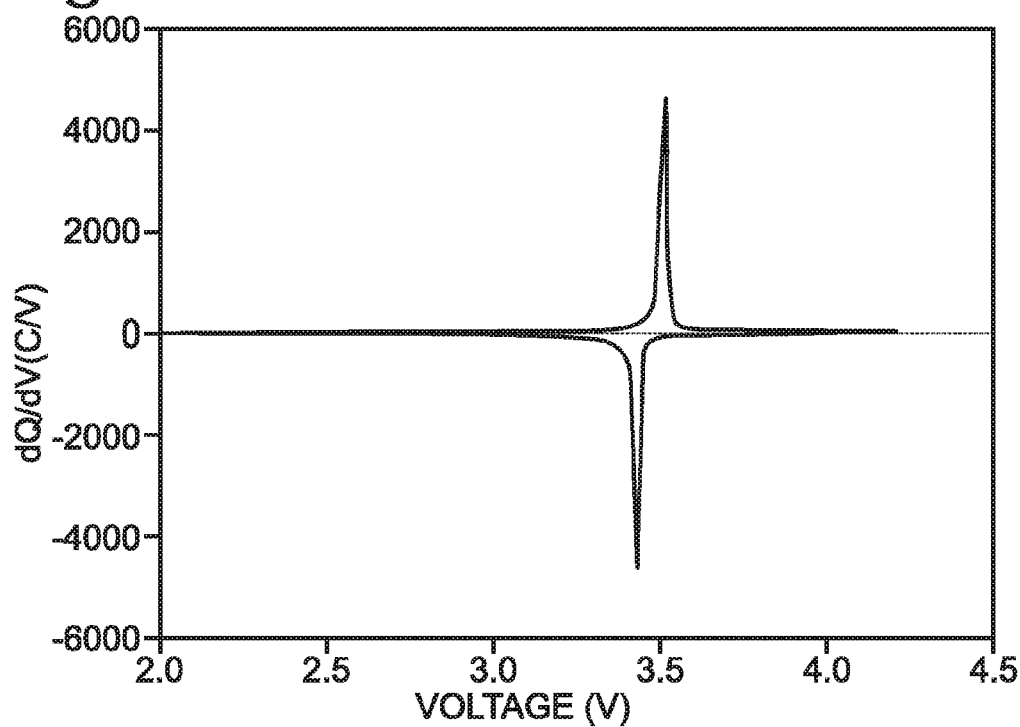

FIGS. 7A and 7B respectively depict the charge/discharge profile of the composite of graphene oxide graphene) and $Na_xMn[Fe(CN)_6]_y \cdot zH_2O$, and a chronoamperogram of the composite of graphene oxide (or graphene) and $Na_xMn[Fe(CN)_6]_y \cdot zH_2O$ at the second cycle. A vacuum drying process was applied to the composite $Na_xMn[Fe(CN)_6]_y \cdot zH_2O$/graphene powder. The counter electrode is sodium metal and the organic electrolyte is saturated $NaClO_4$ in EC/DEC. Graphene oxide in the synthesis solution increases the capacity of $Na_xMn[Fe(CN)_6]_y \cdot zH_2O$ significantly. The vacuum drying process results in the $Na_xMn[Fe(CN)_6]_y \cdot zH_2O$ having single and very flat charge/discharge curves (FIG. 7A), indicating that sodium ion intercalation in the electrode is mostly likely a two-phase process, rather than the solid solution behavior shown in FIG. 6A. The electrode's chronoamperogram (FIG. 7B) also demonstrates the two-phase process with a single sharp peak during charge/discharge.

Figure 8:
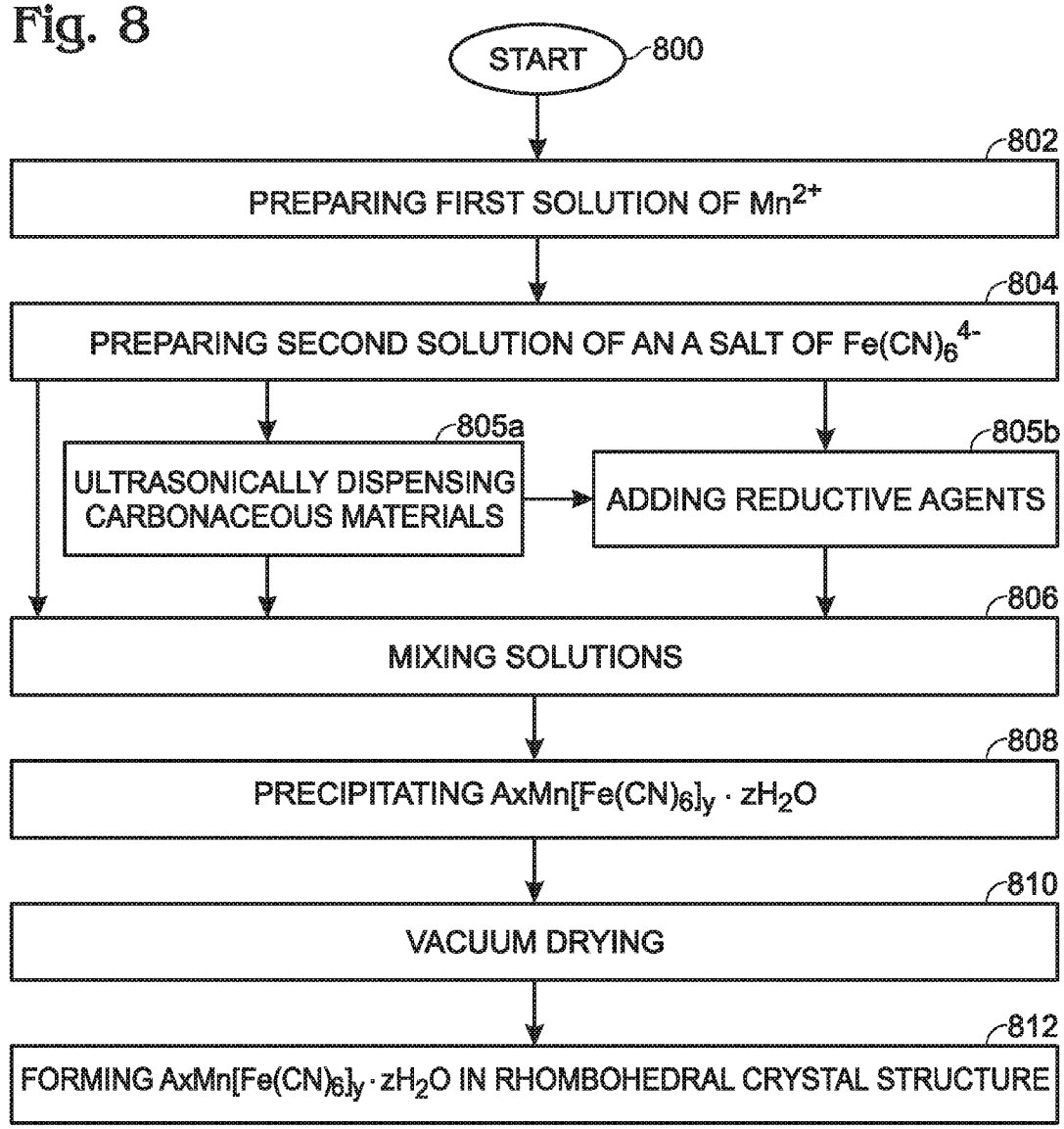
FIG. 8 is a flowchart illustrating a method for synthesizing a TMH battery material.

FIG. 8 is a flowchart illustrating a method for synthesizing a TMH battery material. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 800.

Step 802 prepares a first solution of $Mn^{2+}$. Step 804 prepares a second solution of an A salt of $Fe(CN)_6^{4-}$. Step 806 mixes the first and second solutions. In response to mixing the first and second solutions, $A_xMn[Fe(CN)_6]_y \cdot zH_2O$ is precipitated in Step 808. The A cations are alkali or alkaline-earth cations, such as Na or K. The variable x is in the range of 1 to 2, y is in the range of 0.5 to 1, and z is in the range of 0 to 3.5. Step 810 dries the precipitated $A_xMn[Fe(CN)_6]_y \cdot zH_2O$ in a vacuum oven with a pressure of less than 0.1 torr. In some aspect, the pressure is less than 0.01 torr. For example, the drying temperature may be in the range of 20° C. to 200° C. In one aspect, Step 808 forms the $A_xMn[Fe(CN)_6]_y \cdot zH_2O$ in a cubic structure and Step 812 forms the $A_xMn[Fe(CN)_6]_y \cdot zH_2O$ with a rhombohedral crystal structure, with $Mn^{2+/3+}$ and $Fe^{2+/3+}$ having the same reduction/oxidation potential.

Figure 11A:
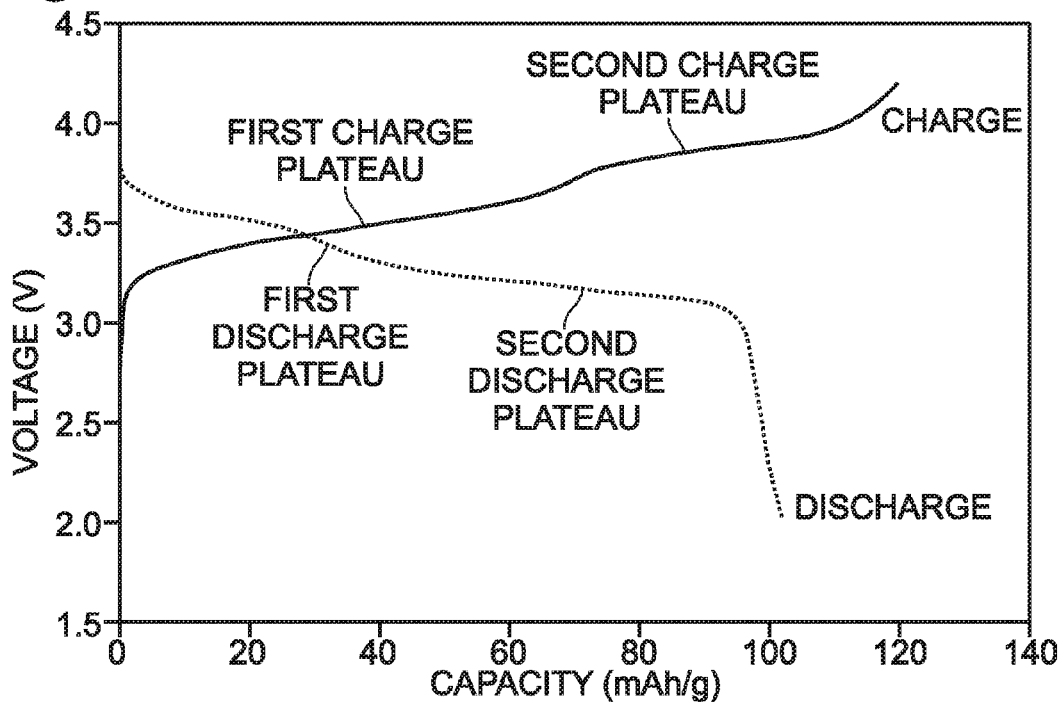
FIGS. 11A and 11B are graphs depicting the electrochemical behavior of a synthesized $Na_xMn[Fe(CN)_6]_y \cdot zH_2O$ cathode in sodium-ion batteries (prior art).
Figure 11B:
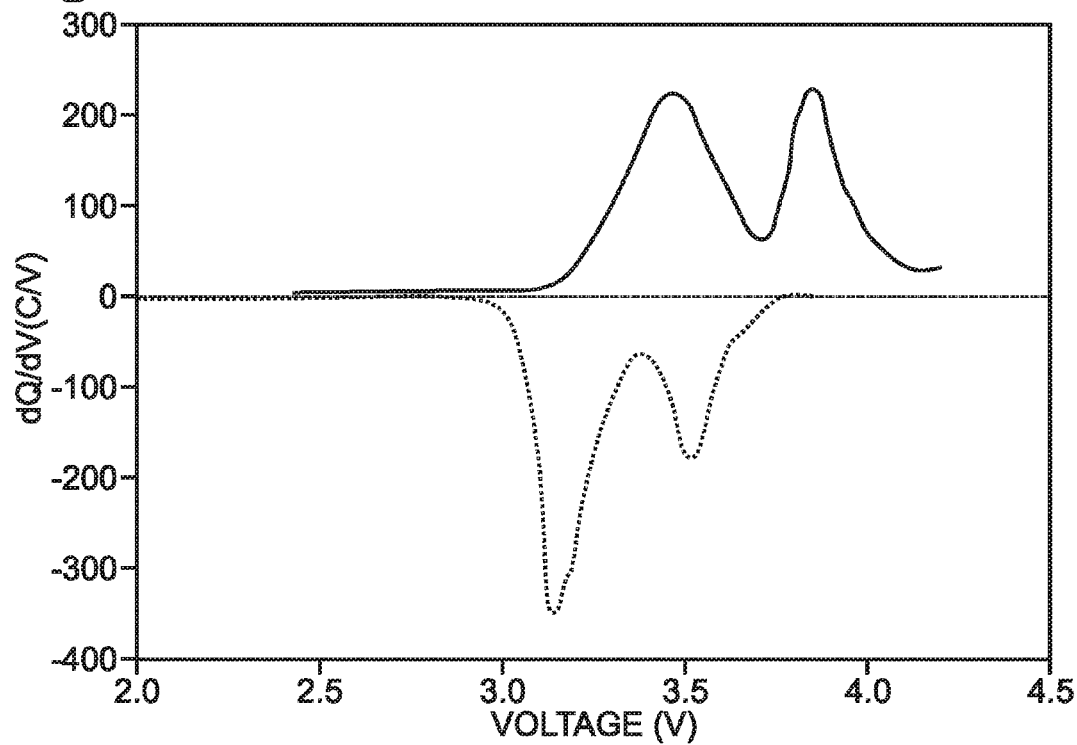

During the synthesis process, it is inevitable that water molecules occupy the large interstitial spaces of TMHs. Water molecules in TMHs cause the A ions to move from the center of the elementary cubes, which makes the A ions interact with the two transition-metal redox couples differently. That is, the A-ions are located in two chemical environments. The charge/discharge, or extraction/insertion of A ions in two chemical environments correspond to the two charge/discharge plateaus seen in FIG. 11A. Under a vacuum with less than 0.1 torr pressure, water molecules are removed from the TMH interstitial spaces, permitting A-ions go to the center of the cubes. All A-ions then have a single, identical chemical environment, which causes just one plateau during charge/discharge. Further, the cubic structure of TMHs is changed to rhombohedral due to the water removal. It is still possible for rhombohedral TMHs to exhibit two plateaus during charge/discharge if the A-ions do not occupy the center positions due to the water molecules in TMHs. However, the water removal from the crystal results in a phase transformation from cubic to rhombohedral, and also is the root cause of the one-plateau behavior of TMHs described herein. In other words, the use of higher vacuum pressure results in the more effective removal of water from the TMH crystal structure, and the single plateau charge/discharge curves.

In one aspect, prior to mixing the first and second solutions in Step 806, Step 805b adds reductive agents to the first solution, the second solution, or both the first and second solutions. Some exemplary reductive agents include sodium borohydride ($NaBH_4$) hydrazine ($N_2H_4$), and a combination of $NaBH_4$ and $N_2H_4$. For example, Step 805b may add the reductive agents to the first solution in a concentration in a range of 0 to 100 moles/liter. Likewise, the reductive agents may be added to the second solution in a concentration of 0 to 100 moles/liter.

In a different aspect, Step 805a ultrasonically disperses carbonaceous materials in distilled water, creating a third solution. Then, Step 806 additionally mixes the third solution with the first solution, second solution, or both the first and second solutions, and precipitating the $A_xMn[Fe(CN)_6]_y \cdot zH_2O$ in Step 808 includes precipitating a composite of carbonaceous materials and $A_xMn[Fe(CN)_6]_y \cdot zH_2O$. Some examples of carbonaceous materials include graphene oxide, partially reduced graphene oxide, graphene, carbon black, and graphite. If the carbonaceous material used in Step 805*a* is graphene oxide, then Step 805*b* may be performed by adding a reducing agent such as $NaBH_4$, $N_2H_4$, or both $NaBH_4$ and $N_2H_4$ to the mixture of the first, second, and third solutions.

Figure 9:
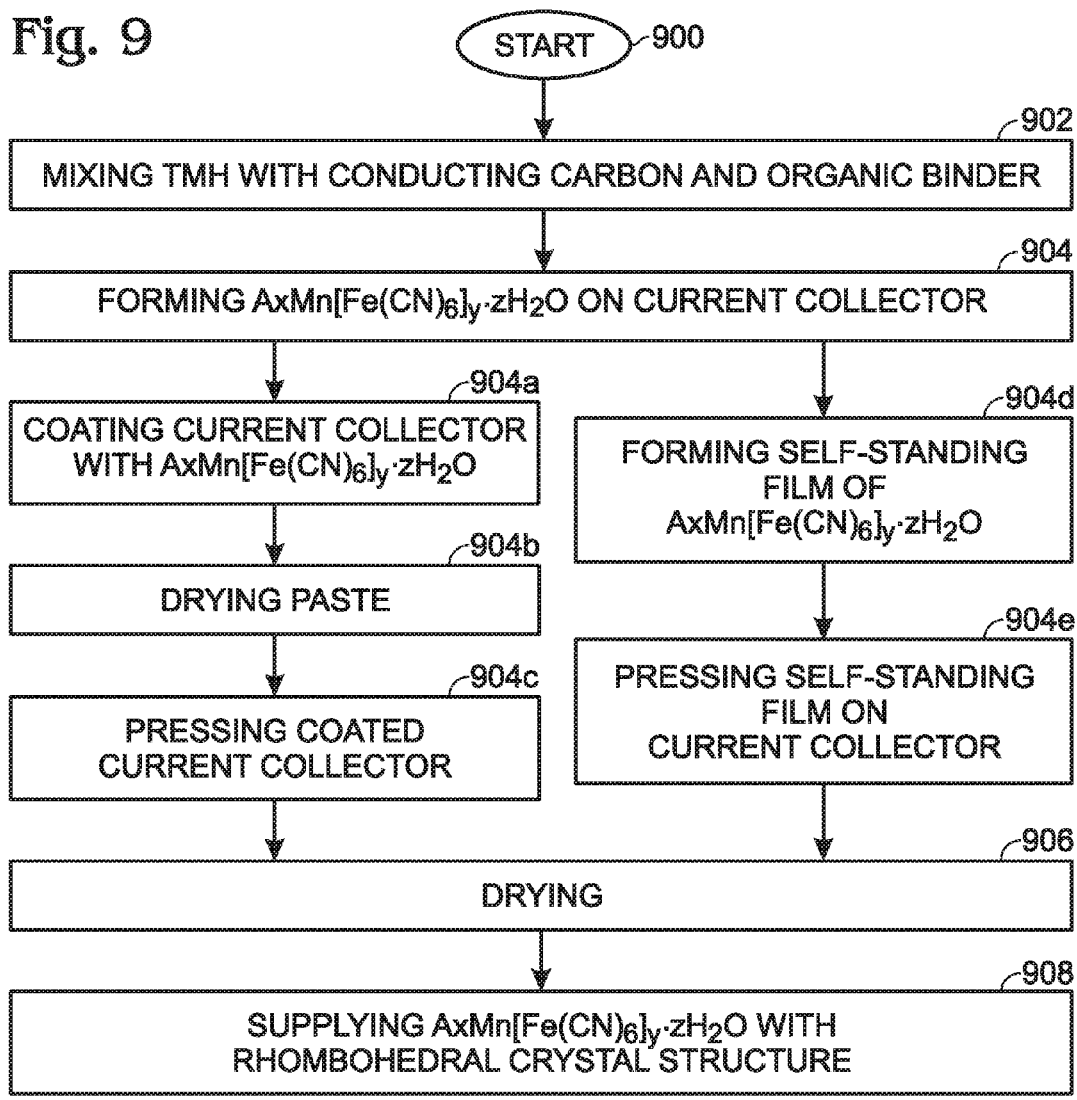
FIG. 9 is a flowchart illustrating a method for fabricating a TMH battery cathode electrode.

FIG. 9 is a flowchart illustrating a method for fabricating a TMH battery cathode electrode. The method begins at Step 900. Step 902 mixes TMH material with a conducting carbon and an organic binder in an organic solution, creating a $A_xMn[Fe(CN)_6]_y \cdot zH_2O$ paste. The A cations are alkali or alkaline-earth cations, such as Na and K. The variable x is in the range of 1 to 2, y is in the range of 0.5 to 1, and z is in the range of 0 to 3.5. Step 904 forms $A_xMn[Fe(CN)_6]_y \cdot zH_2O$ material on a current collector to create an electrode. The current collector may, for example, be aluminum (Al), titanium (Ti), or stainless steel. Step 906 dries the electrode. Step 908 supplies the $A_xMn[Fe(CN)_6]_y \cdot zH_2O$ electrode with rhombohedral crystal structure, with $Mn^{2+/3+}$ and $Fe^{2+/3+}$ having the same reduction/oxidation potential.

In one aspect, the TMH material used in Step 902 is the end product (Step 812) of the method described in FIG. 8, in which case TMH material has already been vacuum dried at a pressure of less than 0.1 torr. Alternatively, creating the $A_xMn[Fe(CN)_6]_y \cdot zH_2O$ paste in Step 902 includes creating the $A_xMn[Fe(CN)_6]_y \cdot zH_2O$ paste in a cubic structure, and Step 906 dries the electrode in a vacuum oven at a pressure of less than 0.1 torr.

In one aspect, forming the $A_xMn[Fe(CN)_6]_y \cdot zH_2O$ material on the current collector in Step 904 includes substeps. Step 904*a* coats the current collector with the $A_xMn[Fe(CN)_6]_y \cdot zH_2O$ paste. Step 904*b* dries the $A_xMn[Fe(CN)_6]_y \cdot zH_2O$ paste, and Step 904*c* presses the coated current collector. After printing and drying (Steps 904*a* and 904*b*), the electrode is very porous due to solvent evaporation. The particles (TMH and conducting carbon) are bonded by organic binder. However, for a battery, the ideal porosity for electrode is smaller, but still large enough to permit the entry of the electrolyte into the electrode. The porosity is reduced by pressing is to compact the particles assembly.

In another aspect, forming the $A_xMn[Fe(CN)_6]_y \cdot zH_2O$ material on the current collector in Step 904 includes alternative substeps. Step 904*d* forms a self-standing film from the $A_xMn[Fe(CN)_6]_y \cdot zH_2O$ paste. Step 904*e* presses the self-standing film on the current collector.

Figure 10:
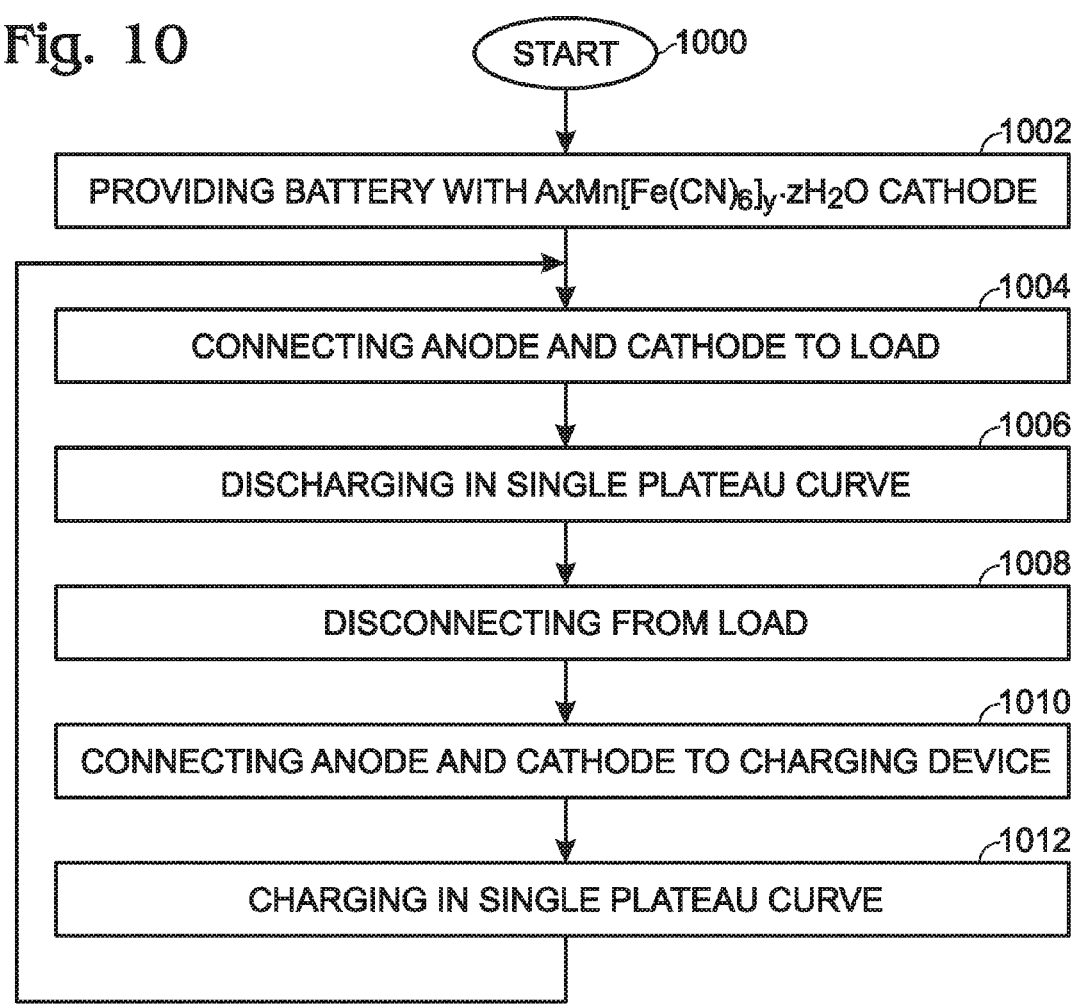
FIG. 10 is a flowchart illustrating a method for using a TMH battery.

FIG. 10 is a flowchart illustrating a method for using a TMH battery. The method begins at Step 1000. Step 1002 provides a battery with an anode, an electrolyte, and a $A_xMn[Fe(CN)_6]_y \cdot zH_2O$ cathode. The A cations are alkali or alkaline-earth cations, such as Na or K. The variable x is in the range of 1 to 2, y is in the range of 0.5 to 1.0, and z is in the range of 0 to 3.5. The electrolyte may be an organic solvent containing an A-atom salt. Step 1004 connects a load between the cathode and the anode. Step 1006 discharges the battery in a single plateau discharge curve, where a single plateau discharge curve is defined as a constant discharge voltage slope between 85% and 15% battery charge capacity. Alternatively stated, in Step 1006 the single plateau discharging curve is defined by the derivative of charge capacity to voltage (dQ/dV) of a completed discharging curve having only one peak. In one aspect, Step 1006 discharges with a capacity of greater than 90 milliamp-hours per gram (mAh/g).

Subsequent to disconnecting the load in Step 1008, Step 1010 connects a battery charging device between the cathode and the anode. Step 1012 charges the battery in a single plateau charge curve, where a single plateau charge curve is defined as a constant charge voltage slope between 85% and 15% battery charge capacity. Alternatively stated, the single plateau charging curve is defined by the dQ/dV of a completed charging curve having only one peak. The battery can be iteratively charged and discharged. In one aspect not shown, the battery can be charged while still connected to a load.

In one aspect, Step 1002 provides the battery cathode $A_xMnFe(CN)_6 \cdot zH_2O$ having a rhombohedral crystal structure with $Mn^{2+/3+}$ and $Fe^{2+/3+}$ having the same reduction/oxidation potential.

A transition metal hexacyanoferrate (TMH) battery, TMH battery fabrication, and TMH battery usage has been provided. Examples of particular materials and process steps have been presented to illustrate the invention. However, the invention is not limited to merely these examples. Other variations and embodiments of the invention will occur to those skilled in the art.

We claim:

1. A transition metal hexacyanoferrate (TMH) cathode battery, the battery comprising:
   a $A_xMn[Fe(CN)_6]_y \cdot zH_2O$ cathode;
      where A cations are selected from the group consisting of sodium and potassium cations;
      where x is in a range of 1 to 2;
      where y is in a range of 0.5 to 1;
      where z is in a range of 0 to 3.5;
   an anode comprising hard carbon; and,
   a non-aqueous electrolyte.

2. A transition metal hexacyanoferrate (TMH) cathode battery, the battery comprising:
   a $A_xMn[Fe(CN)_6]_y \cdot zH_2O$ cathode;
      where A cations are selected from the group consisting of sodium and potassium cations;
      where x is in a range of 1 to 2;
      where y is in a range of 0.5 to 1;
      where z is in a range of 0 to 3.5;
   an anode comprising graphite; and,
   an electrolyte comprising an organic solvent and A-atom salts.

3. The battery of claim 1 wherein the battery electrodes comprise current collectors made of a material selected from the group consisting of aluminum (Al), titanium (Ti), and stainless steel.

4. The battery of claim 1 where the $A_xMnFe[(CN)_6]_y \cdot zH_2O$ has a rhombohedral crystal structure with $Mn^{2+/3+}$ and $Fe^{2+/3+}$ having the same reduction/oxidation potential.

5. The battery of claim 1 wherein the TMH cathode has a single plateau charging curve, where a single plateau charging curve is defined as a constant charging voltage slope between 15% and 85% battery charge capacity.

6. The battery of claim 1 wherein the TMH cathode has a single plateau discharge curve, where a single plateau discharge curve is defined as a constant discharge voltage slope between 85% and 15% battery charge capacity.

7. The battery of claim 2 wherein the battery electrodes further comprise current collectors made of a material selected from the group consisting of aluminum (Al), titanium (Ti), and stainless steel.

8. The battery of claim 2 where the $A_xMnFe[(CN)_6]_y \cdot zH_2O$ has a rhombohedral crystal structure with $Mn^{2+/3+}$ and $Fe^{2+/3+}$ having the same reduction/oxidation potential.

9. The battery of claim 2 wherein the TMH cathode has a single plateau charging curve, where a single plateau charging curve is defined as a constant charging voltage slope between 15% and 85% battery charge capacity.

10. The battery of claim 2 wherein the TMH cathode has a single plateau discharge curve, where a single plateau discharge curve is defined as a constant discharge voltage slope between 85% and 15% battery charge capacity.

* * * * *